(12) United States Patent
Chylla

(10) Patent No.: US 7,170,521 B2
(45) Date of Patent: Jan. 30, 2007

(54) METHOD OF AND SYSTEM FOR STORING, COMMUNICATING, AND DISPLAYING IMAGE DATA

(75) Inventor: Roger Chylla, Madison, WI (US)

(73) Assignee: UltraVisual Medical Systems Corporation, Wilmington, DE (US)

( * ) Notice: Subject to any disclaimer, the term of this patent is extended or adjusted under 35 U.S.C. 154(b) by 653 days.

(21) Appl. No.: 10/116,720

(22) Filed: Apr. 3, 2002

(65) Prior Publication Data

US 2002/0184238 A1 Dec. 5, 2002

Related U.S. Application Data

(60) Provisional application No. 60/281,218, filed on Apr. 3, 2001.

(51) Int. Cl.
  *G06F 12/02* (2006.01)
  *G06T 1/60* (2006.01)
  *G09G 5/39* (2006.01)

(52) U.S. Cl. .................. 345/543; 345/530; 345/531

(58) Field of Classification Search ........ 345/501–506, 345/418, 419, 531, 543, 530; 709/203, 217, 709/218, 219; 382/305
See application file for complete search history.

(56) References Cited

U.S. PATENT DOCUMENTS

| 4,737,921 A | * | 4/1988 | Goldwasser et al. ........ 345/502 |
| 5,235,418 A | * | 8/1993 | Lucas .................... 375/240.22 |
| 5,313,567 A | | 5/1994 | Civanlar et al. |
| 5,319,777 A | | 6/1994 | Perez |
| 5,359,724 A | | 10/1994 | Earle |
| 5,563,718 A | * | 10/1996 | Wober et al. ............... 382/250 |
| 5,592,666 A | | 1/1997 | Perez |
| 5,737,549 A | | 4/1998 | Hersch et al. |
| 5,752,243 A | | 5/1998 | Reiter et al. |
| 5,838,906 A | | 11/1998 | Doyle et al. |
| 5,848,416 A | | 12/1998 | Tikkanen |
| 5,884,016 A | | 3/1999 | Allen et al. |
| 5,918,232 A | | 6/1999 | Pouschine et al. |
| 6,003,036 A | | 12/1999 | Martin |
| 6,014,671 A | | 1/2000 | Castelli et al. |
| 6,122,636 A | | 9/2000 | Malloy et al. |
| 6,157,929 A | | 12/2000 | Zamiska et al. |
| 6,182,114 B1 | * | 1/2001 | Yap et al. ................... 709/203 |
| 6,204,853 B1 | | 3/2001 | Cline et al. |
| 6,219,061 B1 | | 4/2001 | Lauer et al. |
| 6,266,733 B1 | | 7/2001 | Knittel et al. |
| 6,297,799 B1 | | 10/2001 | Knittel et al. |

(Continued)

OTHER PUBLICATIONS

Proceedings of the 4th International Conf. on Information and Knowledge Management, "Dynamic Retrieval of Remote Digital Objects" by Li et al , pp. 182-187, Dec. 1995.*

(Continued)

*Primary Examiner*—Kee M. Tung
*Assistant Examiner*—Hau Nguyen
(74) *Attorney, Agent, or Firm*—Kilpatrick Stockton, LLP

(57) ABSTRACT

A system for storing, communicating, and displaying image or graphic data over a network. The system includes a client that is connectable to a server via a network. The server is configured to store an image file having image data, where the structure of the image file preferably includes submatrices. The submatrices allow the system to render the images using an adaptive rendering technique.

44 Claims, 6 Drawing Sheets

U.S. PATENT DOCUMENTS

| | | | |
|---|---|---|---|
| 6,314,452 B1 | 11/2001 | Dekel et al. | |
| 6,314,466 B1 * | 11/2001 | Agarwal et al. | 709/231 |
| 6,616,701 B2 * | 9/2003 | Doyle | 345/424 |
| 6,633,688 B1 * | 10/2003 | Nixon et al. | 382/305 |
| 6,704,024 B2 * | 3/2004 | Robotham et al. | 709/203 |
| 6,718,192 B1 * | 4/2004 | Samara et al. | 382/128 |
| 6,775,346 B2 * | 8/2004 | Heuscher et al. | 378/4 |
| 6,782,431 B1 * | 8/2004 | Mukherjee et al. | 709/246 |
| 6,909,792 B1 * | 6/2005 | Carrott et al. | 382/128 |

OTHER PUBLICATIONS

IEEE Proceedings of the Conf. on Visualization'00, "Combining Local and Remote Visualization Techniques for Interactive Volume Rendering in Medical Applications" by Engel et al, pp. 449-453, Oct. 2000.*

* cited by examiner

METHOD OF AND SYSTEM FOR STORING, COMMUNICATING, AND DISPLAYING IMAGE DATA

RELATED APPLICATIONS

This patent application claims the benefit of prior filed now abandoned U.S. Provisional Patent Application No. 60/281,218, entitled "METHOD AND SYSTEM FOR STORING, DISPLAYING, AND TRANSMITTING MULTIDIMENSIONAL DATA", filed on Apr. 3, 2001, the entire contents of which is incorporated herein by reference.

BACKGROUND OF THE INVENTION

The present invention relates to a method of and system for storing, communicating, and displaying image data and, particularly, storing the image data at a server, communicating at least a portion of the image data from the server to a client via a network, and displaying one or more images at the client using the communicated data.

In medical imaging, data is acquired by an imaging system (e.g., a computed-tomography system, a magnetic-resonance system, a computed-radiography system, etc.) as a series of two-dimensional (2D) image planes. The series of planes represent a three-dimensional (3D) or higher-dimensional image (e.g., a 3D image changing over time is considered to be a four-dimensional (4D) image). Prior systems stored the series of planes in memory and various storage media as either a "slice" model or a "matrix" model.

The slice model is a structure where the acquired data is stored as a series (sometimes referred to as a "stack") of images. That is, each image plane is represented by a 2D array. Each 2D array includes a plurality of points represented by the structure (x, y), and each point has a value (e.g., an intensity, color, etc.).

The matrix model is a structure where the acquired data is stored as a single 3D array. The 3D array includes a plurality of points represented by the structure (x, y, z), and each point has a value (e.g., an intensity). For the matrix model, the 3D array includes all of the acquired points.

Medical image viewing has traditionally been film-based. A physician interested in viewing a multi-slice data set had no choice but to view the data as it was acquired, i.e., as a series of 2D planes along the direction of the scan. Both the slice model and matrix models are sufficient mechanisms to store data that is rendered in this fashion. However, these models are not adequate in other applications.

SUMMARY OF THE INVENTION

Four trends in current medical imaging have introduced limitations to the slice and matrix models for representing medical images. These trends are 1) the increasing dimensionality of the data sets (e.g., 4D imaging), 2) the increasing size of the data sets, 3) the growing practice of remote image viewing, and 4) the growing utility of generating 3D digital reconstructions of the data (e.g., multi-planar reconstruction (MPR), oblique-data slicing, surface rendering, volute rendering, etc.) The four trends have also introduced drawbacks to the slice and matrix models for storing and communicating data. The drawbacks include 1) inefficient retrieval of the data from memory and permanent media and 2) non-optimal management of network bandwidth.

A. Inefficient Retrieval of the Data From Memory and Other Storage Media.

When planes are accessed along a non-axial dimension, both the matrix and slice models force the entire data set to be loaded into memory before rendering can take place. This limitation means that the computer rendering the image must hold the entire data set in its memory and that the time required to render the first image cannot be faster than the time to retrieve the entire series from storage media.

An additional limitation of the matrix model is that consecutive points along the higher order dimensions (e.g., the third or fourth dimensions) are spaced far apart in computer memory. Points spaced far apart in memory are retrieved much less efficiently than points closer together. Rendering of coronal and sagittal slices is, therefore, much slower than rendering of transverse slices. This limitation is overcome with transposition of the data sets, but only at the cost of replicating the data in memory.

B. Non-optimal Management of Network Bandwidth.

When using a remote client to view slices along arbitrary planes of an image, the viewing application can either choose to render the image on the server followed by transmission to the client or to transmit the data set to the client followed by the client rendering the images locally. These two strategies are referred to herein as "server-based" and "client-based" rendering, respectively. Server-based rendering has the advantage that the entire data set need not be transferred to the client prior to rendering. This is important when rendered images are required very quickly at the onset of the session. Client-based rendering has high performance since the application does not need to retrieve the data over a network once the data is obtained. The limitations of client-based rendering, however, are that the client requires sufficient memory to store the image file and a latency period during which no rendering can take place while the client is downloading the data from the server.

If the client requires an image orthogonal to the acquisition plane, the matrix and slice models force prior imaging applications to choose between performing client-based or server-based rendering. That is, the application is pre-programmed to either render the data on the server or wait until the entire data set is transferred to the client before local rendering can take place.

The invention provides, in one embodiment, a system with two components: 1) a representation of D dimensional image data as a series of contiguous D dimensional matrix blocks (also referred to herein as "an array of matrices" or "submatrix representation") and 2) an "adaptive" rendering component which switches between server-based and client-based rendering. The submatrix representation facilitates rendering of arbitrary planes through the data set (without transposition or replication of the data), compression of the image, and the efficient transmission of regions of the data set over a computer network. The adaptive rendering component enables a client viewer to enjoy the benefits from both server- and client-side rendering by optimally switching between the two modes based upon the session state, the speed of the network connection, and the computing power of the client.

In another embodiment, the invention provides a method of displaying images of a multidimensional item at a client. The multidimensional item is stored as a data file at a server, and the data file includes image data constructable to form the multidimensional item. The method includes requesting a first image and communicating a first portion of the image data to the client. The first portion of the image data includes data for displaying the first image. The method further includes storing the first portion of the image data at the client, the storing of the image data results in stored data; requesting a second image; and determining whether the stored data includes the data for displaying the second image. If the stored data does not include the data for displaying the second image, then the method further includes communicating a second portion of the image data to the client, and storing the second portion of the image data at the client. The storing of the second portion of the image data results in the stored data including the data for displaying the second image.

In yet another embodiment, the invention provides a method of rendering an image of a multidimensional item. The rendering occurs at one of a server and a client, which are connectable via a network. The method includes storing a data file at the server. The data file includes image data that is constructable to form the multidimensional item. The method further includes requesting an image and performing at least one of: 1) determining a communications speed for the network, 2) determining a memory size of a memory of the client, 3) determining an available memory size of a memory of the client, 4) determining a computing capability of the client, and determining a session state. The method also includes determining whether to render the image at the server or the client. The determination is based in part on at least one of 1) the communications speed of the network, the memory size of the memory, the available memory size of the memory, the computing capability of the second computer, and the session state. The method further includes rendering the image at the server when the determination is made to render the image at the server, and rendering the image at the client when the determination is made to render the image at the client.

In even yet another embodiment, the invention provides a method of storing an image file in memory. The method includes receiving a three-dimensional image file having image data representing a three-dimensional item, structuring the received image file using submatrices, and storing the structured image file.

Other features of the invention will become apparent by consideration of the detailed description and accompanying drawings.

DETAILED DESCRIPTION

Before any embodiments of the invention are explained, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" are used broadly and encompass both direct and indirect connection, coupling, and mounted. In addition, the terms "connected" and "coupled" are not restricted to physical or mechanical connections or couplings.

Figure 1:
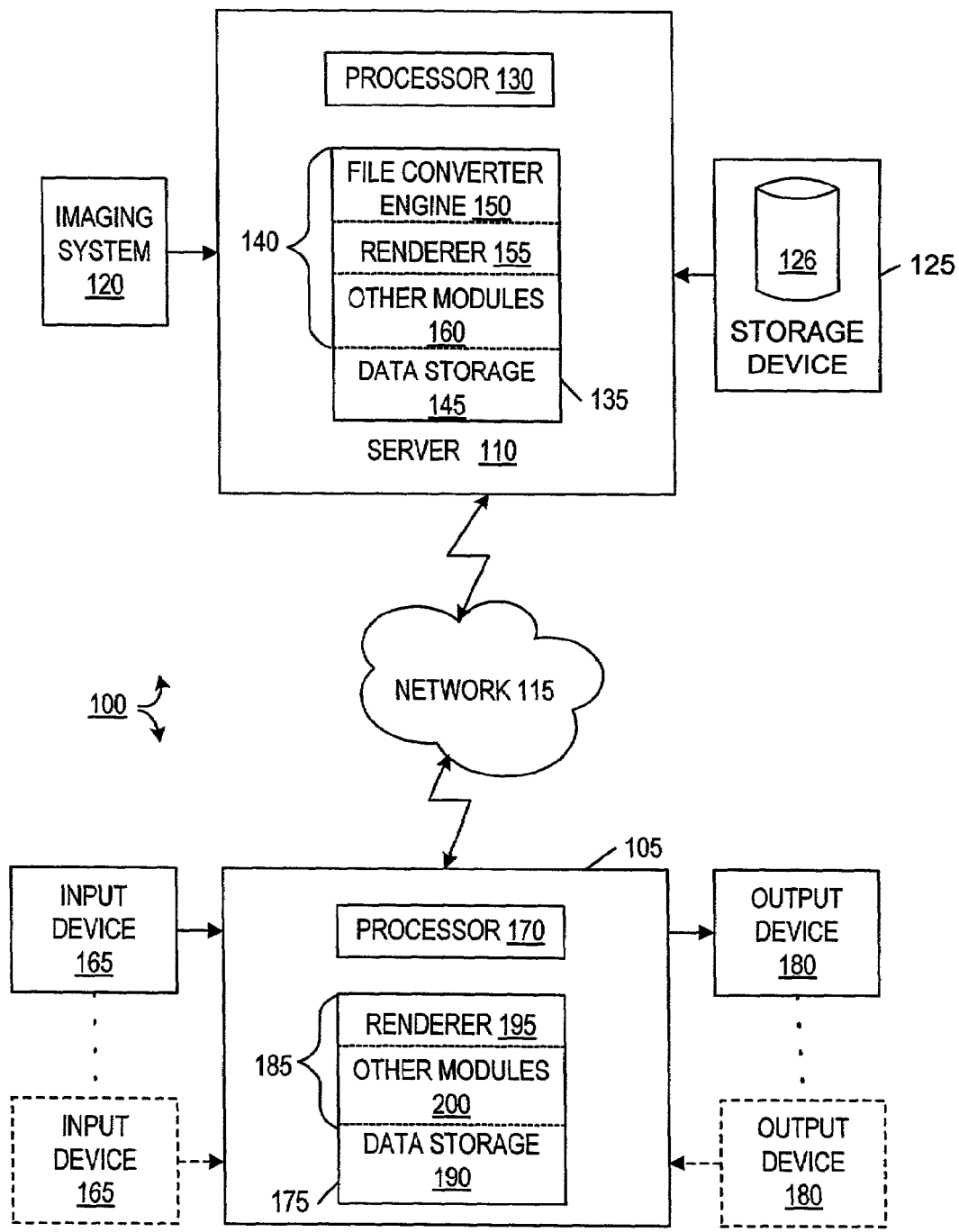
FIG. 1 is a schematic diagram of a system embodying the invention which stores, communicates, and displays image or graphic data.

A system 100 for storing, communicating, and displaying image or graphic data over a network is schematically shown in FIG. 1. The system generally includes a client 105 that is connectable to a server 110 via a network 115. In some embodiments, the system 100 also includes an imaging system 120 and/or a storage device 125, which may store a database 126. Unless specified otherwise, the system 100 includes each of the elements 105, 110, 115, 120, and 125. Further, while the system 100 is capable of storing, rendering, and communicating a variety of multidimensional image or graphic data over a network, the description below, unless specified otherwise, is in reference to multidimensional image data acquired by a medical imaging system.

The imaging system 120 may be any imaging or graphic generating system operable to generate an image file having image or graphic data. The image or graphic data is constructable to form images or graphics of items. In the embodiment shown, the imaging system is a medical imaging system (e.g., a computed-tomography system, a magnetic-resonance system, a computed-radiography system, etc.) that acquires a plurality of parallel 2D images of an object. The plurality of 2D images is stored by the imaging system 120 in an image file as either 1) an array of areas or planes, or 2) as a single matrix. The stored image data is constructable (e.g., by a computer) to form an item that represents the scanned object. However, the invention is not limited to medical imaging systems. Other imaging systems may be used to generate the image data or the imaging system may be a graphics generator that generates graphic data. Unless specified otherwise, the terms "image file," "image data," and "images" include a computer-generated graphic file, computer-generated graphic data, and computer-generated graphics, respectively. Further, the image file generated by the imaging system may be in other formats than the above-described array of planes or single matrix. For example and in some embodiments, the imaging system makes available a plurality of 3D matrix blocks (discussed further below) that form the 3D matrix. For the description herein, unless specified otherwise, the generated image file includes image data structured as either a plurality of 2D images or a 3D array, where the image data are constructable to form an item that represents an object.

For the embodiment shown in FIG. 1, the imaging system provides the image file to the server 110. However, in other embodiments, the imaging system stores the images on a "permanent" storage medium (e.g., a medium at storage device 125) and the server 110 obtains the image file from the storage medium.

The server 110, in general, receives the image file, converts the image data of the image file into a series of D dimensional matrix blocks (if necessary), stores the matrix blocks in memory, renders images (if necessary), and communicates the matrix blocks and/or the rendered images to the client 105 via the network 115. As used herein, the terms "computer" and "server" are not limited to a device with a single processor, but may encompass multiple computers linked in a system, computers with multiple processors, special purpose devices, computers or special purpose devices with various peripherals and input and output devices, software acting as a computer or server, and combinations of the above. For the embodiment shown in FIG. 1, the server 110 includes one or more processors 130 and a memory 135. For the description below, it will be assumed that the server 110 has only one processor 130. The processor 130 receives, interprets, and executes software instructions stored in the memory 135; and receives, interprets, manages, and communicates information from and to the imaging system 120, the storage device 125, the client 105, and the memory 135. As used herein, the term "information" is broadly construed to include data, commands, and signals.

The memory 135 includes one or more memory devices (e.g., memory chips, memory modules, etc.) acting as a temporary memory (e.g., RAM), and is preferably relatively large or expandable. The memory 135 includes program storage 140 and data storage 145. The program storage 140 includes a plurality of software modules such as a file-converter engine 150 and a renderer 155. The file-converter engine 150 converts files having image data that are in an undesired format to an array of matrices. The renderer 155 renders images and determines the appropriate matrices corresponding to the rendered images. Operation of the file-converter engine 150 and the renderer 155 will become more apparent in the operation description below. The program storage 140 further includes other software modules 160 used by the server 110 that would be apparent to one skilled in the art. Examples of other software modules include an operating system, a communications module, a data manager, and other known modules.

The data storage 145 temporarily stores data, including 3D and 4D image files. For the embodiment shown, an image file is stored in the data storage 140 while a client is displaying an image of the image file. However, it is envisioned that in other embodiments the image files are maintained in the storage device 125 at all times. Operation of the server 110 is described in more detail below.

The storage device 125 includes one or more memory devices that provide storage for image files. For the embodiment shown, the storage device 125 includes one or more external storage devices (e.g., magnetic storage devices, optical storage devices, etc.) that maintain a database of 3D or 4D image files and is preferably expandable or substantially infinite. The image files are "permanently" maintained in the storage device 125. When an image file is requested for viewing, the file is communicated to the server 110, processed for viewing (if necessary), and stored in the data storage 145 until viewing is completed.

As shown in FIG. 1, the imaging system 120 and the storage device 125 are in communication with the server 110 by direct connections. However, it is envisioned that the communications between the server 110, the imaging system 120, and the storage device 125 may be by indirect connections.

The network 115 is not limited to a single network, but may encompass one or more interconnected networks. For example and in one embodiment, the network 125 is the Internet. However, the network 125 may be a private network or even a single connection between the server 110 and the client 105. For the embodiment shown in FIG. 1, the communication protocols between the server 110 and the client 105 are primarily transmission control protocol/Internet protocol ("TCP/IP") based. However, other communication protocols are possible.

The client 105 may be implemented using a variety of electronic devices operable to connect to the server 110 (e.g., via the network 115), receive image data from the server 110, and communicate the data to an operator (e.g., through a display). The client 105 generally includes one or more input devices 165, a processor 170, a memory 175, and one or more output devices 180. For the embodiment shown, the system 100 includes only one client 105. However, the number of clients may vary, and the number of clients connectable to the server 110 is only limited by the capacity of the network 115 and the server 110.

The one or more input devices 165 receive input or data and provide the received input or data to the processor 170. Example input devices 165 include a keyboard or keypad, a pointing device (e.g., a mouse, a track ball, touch pad, etc.), a touch screen, a scanning device, microphone, or similar devices.

The processor 170, which may include multiple processors, receives data or inputs from the one or more input devices 165; receives, interprets, and executes software instructions from the memory 175; receives, interprets, manages, and communicates information from the server 120; and communicates data or outputs to the one or more output devices 180.

The memory 175 may include one or more memory devices (e.g., memory chips, memory modules, etc.), and may be relatively large (i.e., is capable of storing large image files or multiple image files). However, in some embodiments, the memory 175 is limited in size (i.e., is incapable of storing large image files or multiple image files). The memory 175 includes program storage 185 and data storage 190. The program storage 185 includes a plurality of software modules, including a renderer 195. The renderer 195 renders desired images from matrices communicated to the client 105 from the server 110. The program storage further includes other software modules 200 used by the server that would be apparent to one skilled in the art. Example software modules include an operating system, a communications module, a data manager, drivers for the input/output devices, and other known modules. The data storage 190 temporarily stores data, including communicated portions of the image file. Operation of the client 110 will become more apparent in the operation description below.

The one or more output devices 180 receive output or data from the processor 170 and perform an action (e.g., displaying, printing, storing, transmitting, etc.) with the received data. Example output devices include a visual display device (e.g., a monitor), a hard-copy device (e.g., a printer), a storage device (e.g., a magnetic storage device, an optical storage device), an audio device (e.g., a speaker), a communications device (e.g., an antenna), or similar devices. It is also envisioned that the input and output devices may be incorporated as one device (e.g., a touch screen).

Referring again to FIG. 1, the one or more input devices 165, the housing 205, and the one or more output device 170 are shown as separate components. However, the devices 165 and 170 may be incorporated within a single housing. Example electronic devices capable of being used as a client 105 include a computer, an Internet appliance, a personal data assistant (PDA), a handheld device, and similar devices.

Having described basic architectures of the system 100, the operation of various embodiments will now be described. It should be understood that the system may include other components or elements that are not discussed above.

Figure 2A:
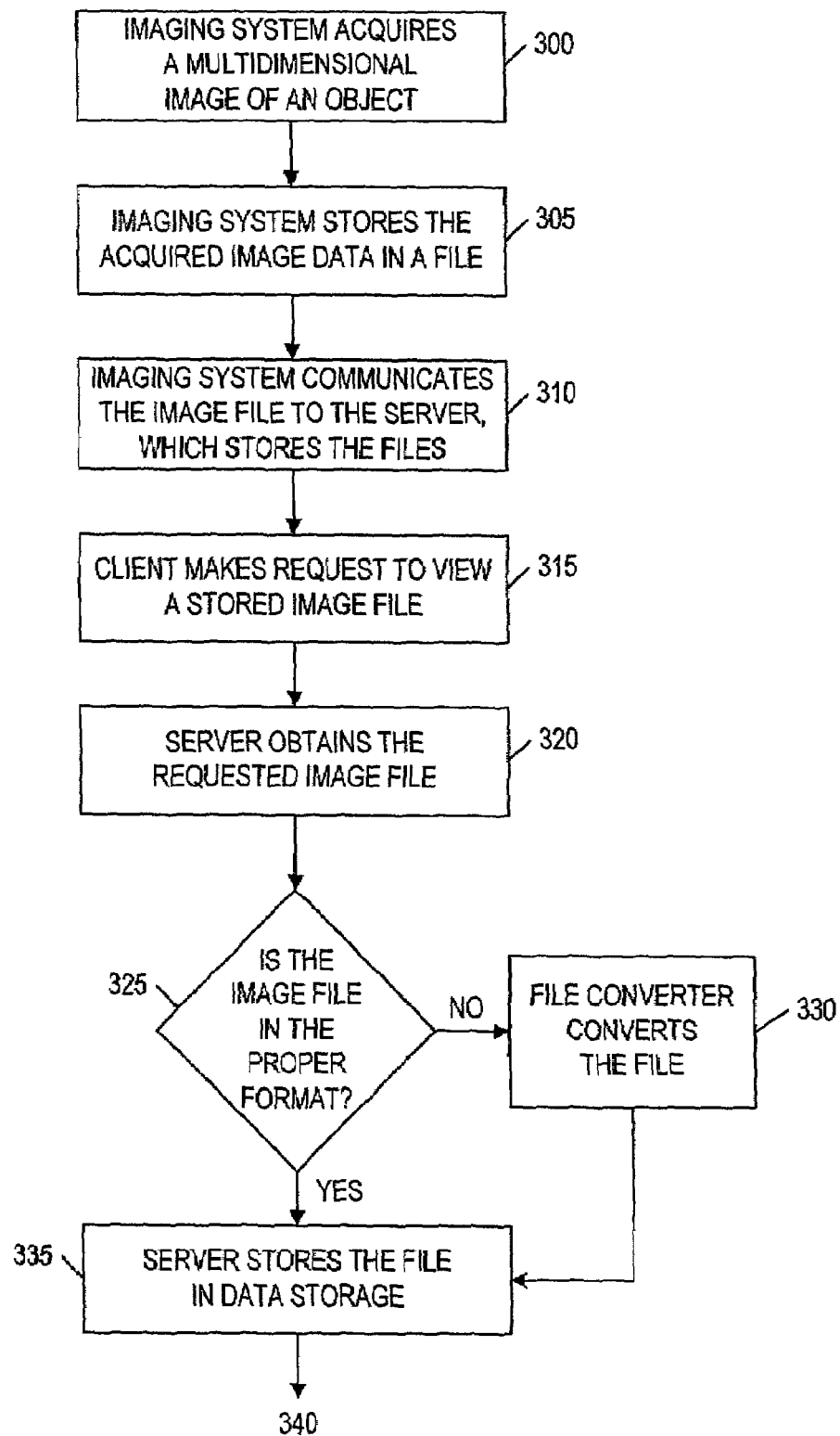
FIGS. 2A and 2B are flowcharts that represent one method of operation of the system shown in FIG. 1.
Figure 2B:
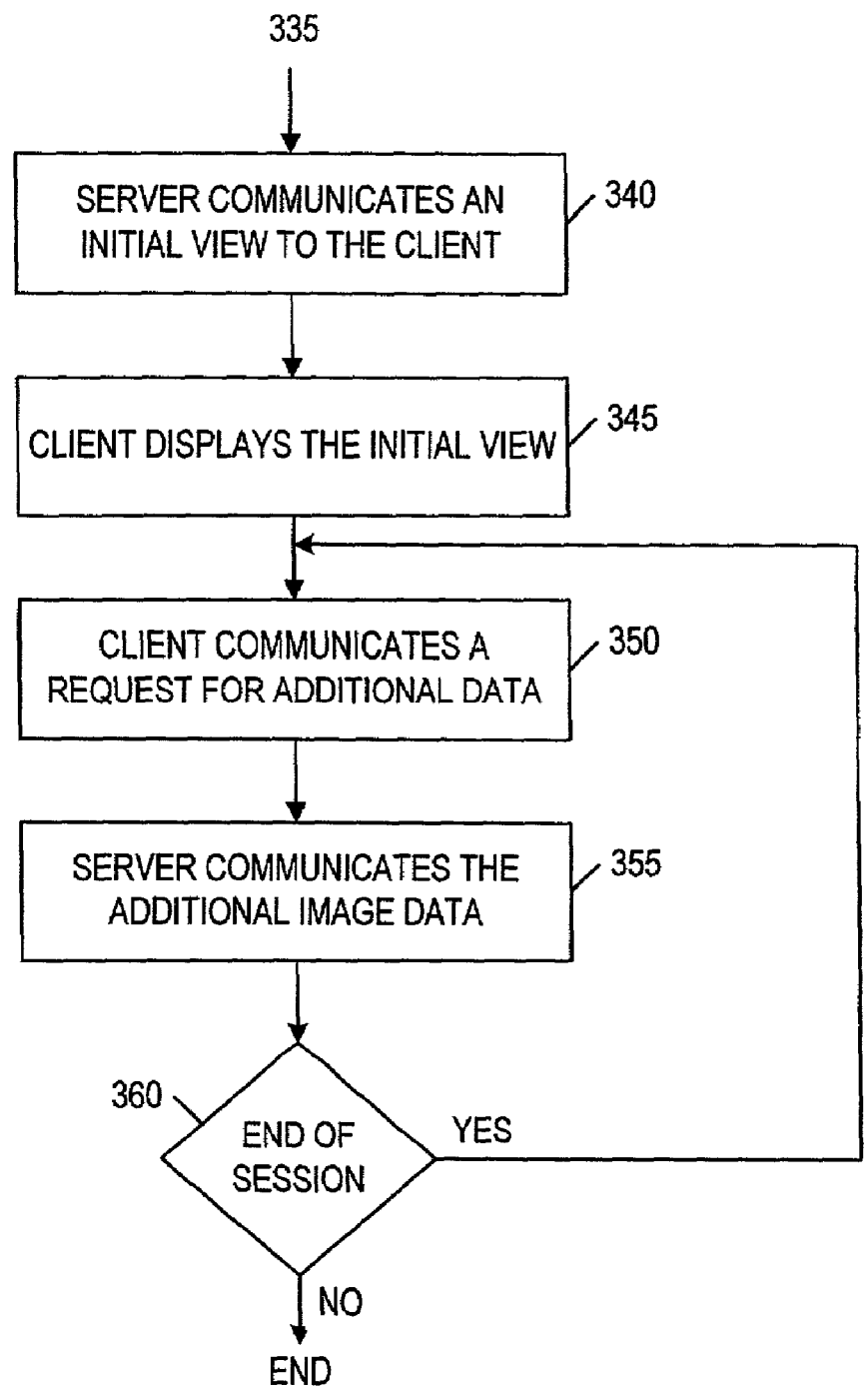

The system 100 is designed to overcome the inefficient retrieval of data from the memory 135 and/or the data storage 145, and the non-optimal management of network bandwidth that occurs when multi-planar reconstructions of large data sets are requested by the client 105. One method of operation for the system 100 is schematically shown in FIG. 2. At act 300, the imaging system 120 acquires image data of an object. As used herein, the term "object" is the thing of concern. For example, if the imaging system 120 is a medical imaging system, then the medical imaging system acquires image data for an aspect of a patient (e.g., a patient's body or a portion of a patient's body).

While acquiring the image data, the imaging system 120 stores the image data in a file (act 305). How the imaging system 120 acquires and stores the image varies depending on the imaging system used. For a typical medical imaging system, the system 120 acquires the image data of an object 400 (FIG. 3) as a series of 2D slices (only 4 slices are shown) 405. Each slice 405 includes a plurality of points 410 having data values. The pluralities of points 410 and data values, when constructed, form an item (shown in Phantom as 415) that functionally relates to or represents the object 400. That is, the item 415 is an image of the object of interest 400.

In various embodiments, the imaging system 120 stores the slices in a file as a 3D array (schematically represented as 420) or as a series of 2D arrays (schematically represented as 425). The 3D array 420 or the series of 2D arrays 425 are constructable to form the 3D image 415. However, other variations of storing the image data are possible. For example, if the imaging system 120 acquires 4D images, then the image file may contain a series of 3D arrays. As another example and in other embodiments, the image data is structured as an array of matrices (discussed below).

At act 310 (FIG. 2), the imaging system 120 communicates the image file to the server 110, which stores the image file in the storage device 125. In other embodiments, the imaging system 120 communicates the image file to the storage device 125. The storage device 125, which may be a permanent storage device, stores the image file 125 for later use by the server 110. In yet other embodiments, the imaging system 120 communicates the image file to the server 110, which stores the image file in the data storage 145.

At act 315, the client makes a request to view a stored image file. For example and in one embodiment, an operator activates the client 105, accesses the server 110 via the network 115, and communicates a request to the server for viewing a specific file.

At act 320, the server 110 obtains the requested image. For the embodiment shown, the server obtains the image file from the storage device 125 and places the image file in the data storage 145. Depending on how the data is stored within the image file (act 325), the server may apply the requested image to the file-converter engine 150, which converts the data of the image file to an image file including matrices (act 330).

Figure 3:
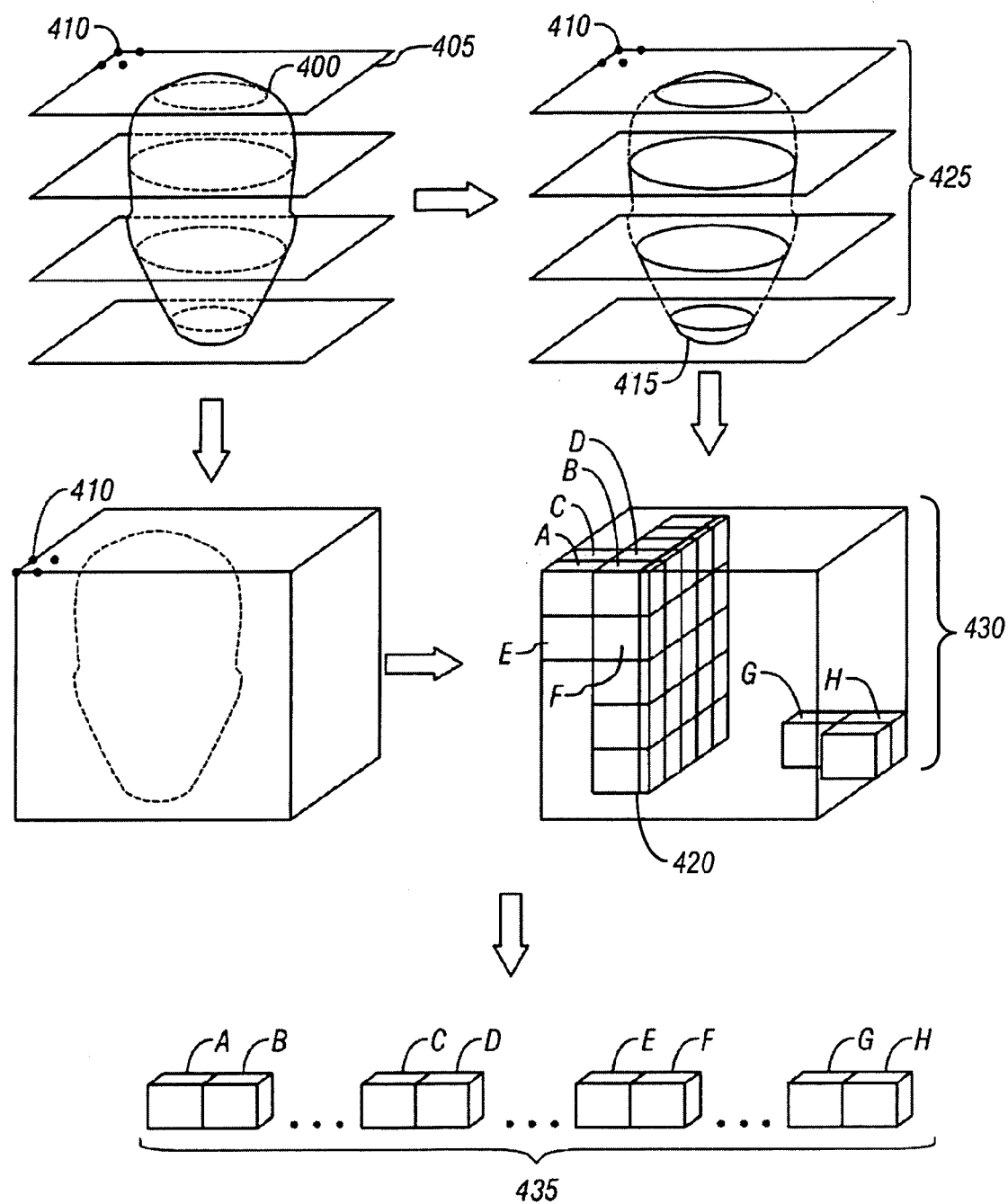
FIG. 3 includes graphical representations of different multidimensional data structures.

For example, FIG. 3 shows a graphical representation of an image file having an array of planes 425. The file-converter engine 150 converts the array of planes 425 into a plurality of matrices (graphically represented as 430, where only some of the matrices are shown). The plurality of matrices are stored in the data storage 145 as an array (q) of matrices (x, y, z) (graphically represented as 435). Similarly, for embodiments where the image file stored in the storage device 120 as a 3D matrix 420, the file-converter engine 150 also converts the large 3D matrix 420 into an array of matrices 435. Each "sub-matrix" (graphically represented as a . . . f) stores a local 3D dimensional region of the data set. The smaller size of the sub-matrices, a . . . f, increases the chance that consecutive data points along any dimension are spaced closer together in computer memory as compared to the single matrix 420 or layer representations 425. Additionally, the lossless compression capacity of the data blocks, a . . . f, increases because data within a local region are more likely to have a reduced dynamic range.

In one embodiment, the size of each submatrix block, a . . . f, is calculated according to the equation:

$$n_d = 2^{round\left[\frac{\log_2(N_d)}{2}\right]} \quad 1 \le d \le D, \quad (1)$$

where $n_d$ is the number of points along dimension d of the submatrix a . . . f, $N_d$ is the number of points along dimension d of the full data set 430, and D is the total number of dimensions in the data set 430. Preferably, the value of $n_d$ is subject to the following constraint:

$$2^{12} \le Z \le 2^{14}, \text{ where } Z = \prod_{d=1}^{D} n_d. \quad (2)$$

If Z is above the limit of $2^{14}$ then the values of $n_1, n_2, \ldots, n_d$ (i.e., a . . . h) are divided by 2 until the limit is no longer violated. If Z is below the limit of $2^{12}$, the values of $n_1, n_2, \ldots, n_D$ are multiplied by 2 until the limit is no longer violated. The inventor(s) established equations (1) and (2) based on the following considerations:

1) Provide efficient access along any dimension by maintaining a constant ratio along each dimension between the length of the matrix along that dimension and the corresponding number of points in each submatrix block.
2) Prevent excessive fragmentation of the data by enforcing a minimum submatrix size. Too small of a submatrix block increases the number of retrievals made to permanent media and thus slows down retrieval times.
3) Prevent the size of the submatrix block from becoming too large and thus losing the benefits of the submatrix model versus the matrix model.

Thus, for the embodiment shown, if the image file obtained by the server 110 is not in the form of a 1D array of matrices that satisfy equations 1 and 2, then the file-converter engine 150 converts each 3D image of the image file into a 1D array of matrices that do satisfy equations (1) and (2). Once the file-converter engine 150 converts the image file, the server 110 stores the converted image file 435 in data storage 145. For other embodiments, the server 110 stores the acquired image file within the data storage 145 and the file-converter engine 150 converts the image data as the data is being communicated to the client 105.

Before proceeding further, it should be noted that an image file having a 4D image may be stored as a series of 3D images, where each 3D image has a plurality of submatrices, or as a 2D array of submatrices. The operation of the system 100 for a 4D image is similar to a 3D image except for the added dimension (usually time).

It should also be noted that when the server 110 receives an image from the imaging system 120, the server 110 may perform the file conversion, if necessary, before storing the image file 435 in the storage device 120. In yet other embodiments, if the structure of the image data within the image file is not in the format of an array of matrices, then the server 110 stores the converted image file 435 over, or in addition to, the original image file.

Once the image file 435 is properly stored within the data storage 145, at act 340, the server 110 communicates an initial image (also referred to herein as "view") of the item to the client 105 via the network 115. The initial image is an arbitrary image (e.g., an image plane 440, FIG. 3) of the item and is communicated (e.g., displayed) at the client 105 to an operator (act 345).

Figure 4:
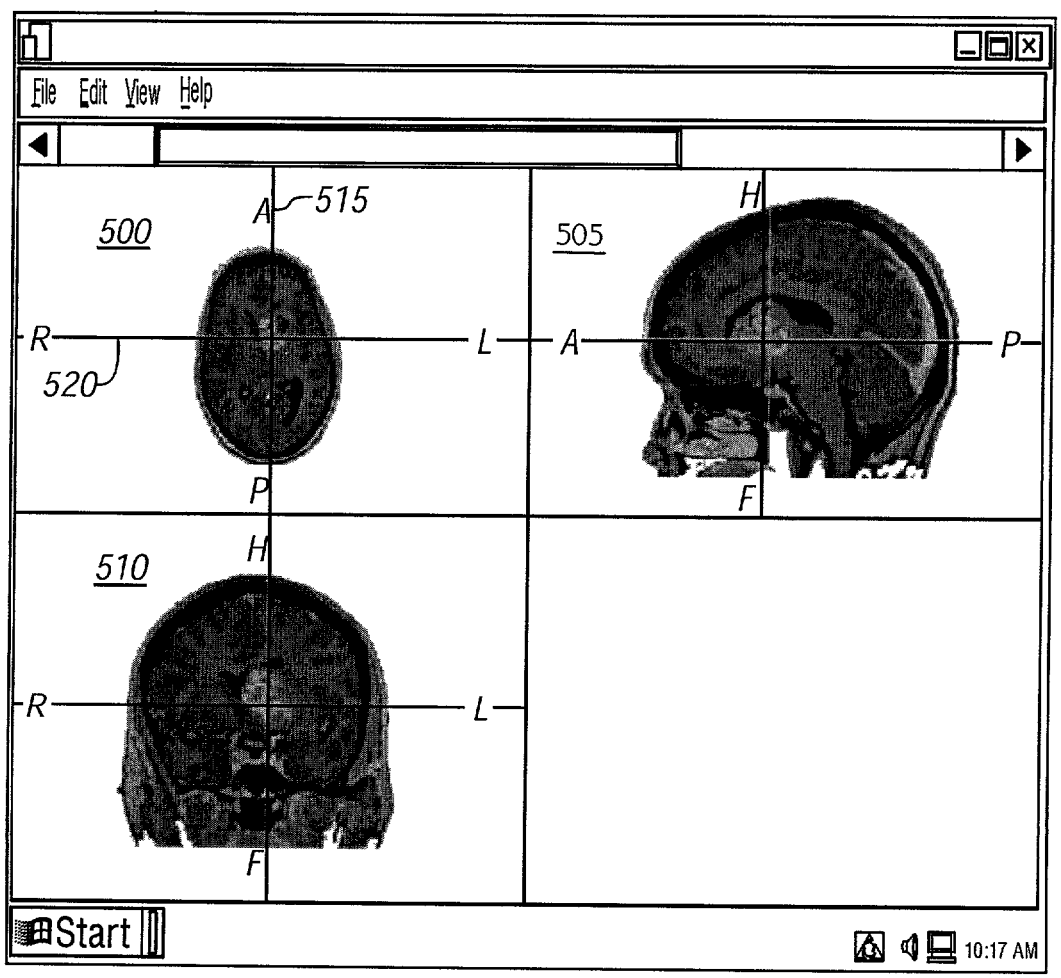
FIG. 4 represents a sample screen print displayed to an operator by the client shown in FIG. 1.

The client 105 and the server 110 then exchange subsequent requests and image data (acts 350, 355, and 360). The exchanges allow the client to communicate multiple images of the item to the operator. In one embodiment and as shown in FIG. 4, the client 105 displays an initial image plane 500 and related orthogonal views 505 and 510. The operator uses one of the input devices 165 (e.g., a pointing device) to activate one of the views (e.g., view 500). The operator then uses a cursor (e.g., formed by lines 515 and 520) to change the shown image. The lines 515 and 520 provide the geometry necessary to establish the desired plane of interest and the displayed image 500 varies as the user moves the cursor. Similarly, as the image 500 changes, the related orthogonal views 505 and 510 change. If the client 105 does not have the necessary image data for one of the images, then the client 105 communicates a request to the server 110 and the server 110 responds by providing the additional image data. The additional image data allows the client 105 to display the requested image.

The communicating and displaying of the multiple images preferably includes an "adaptive" rendering technique. For adaptive rendering, data is rendered either at the client 105 or at the server 110, depending on what is optimal for a given environment. Considerations include the session state, the speed of the network 115, the speed of the processor 170, and the amount of memory in the data storage 190 (e.g., the amount of available memory for image data).

For example, if the network connection is slow, then downloading of data blocks will not keep up with requests for image rendering. This will result in a condition of the server rendering the image. That is, for low-bandwidth connections, the server 110 renders each requested image and communicates the rendered image to the client 105 for display.

If the network connection is fast, then a preference for rendering at the client results. The client 105 downloads the matrices having the requested necessary data for rendering the requested image. The downloading of the matrices will be ahead of requests for images.

In one embodiment, the system 100 determines the computing power of the client 105 at the beginning of the session and determines the speed of the network (e.g., using a "ping") when a request is sent to the server 110. If the data storage 190 has sufficient memory to hold the necessary matrices to render a requested image at the client 105 and if the network speed is sufficient, then the system 100 performs the rendering at the client 105; otherwise the server renders the images.

Additionally, the memory available to the client 105 determines how many matrices are cached (i.e., stored in the data storage 190) by the client 105. For example, the system 100 accommodates "thin-client" devices by storing only those matrices used to render the current image. The system 100 accommodates "thick-client" devices by keeping a semi-permanent cache of the image data communicated to the client 105. If a "thick-client" device runs out of memory, then the client 105 overwrites the oldest cached image data.

For client-based rendering using the data structure 435, the server 110 communicates only the plurality of matrices that include the requested image. When a new image for a given orientation and position is requested, the client 105 determines whether its data buffer contains all of the matrices associated with that image. If not, the client 105 places a request to retrieve the requested image from the server 110 on a priority queue.

Figure 5:
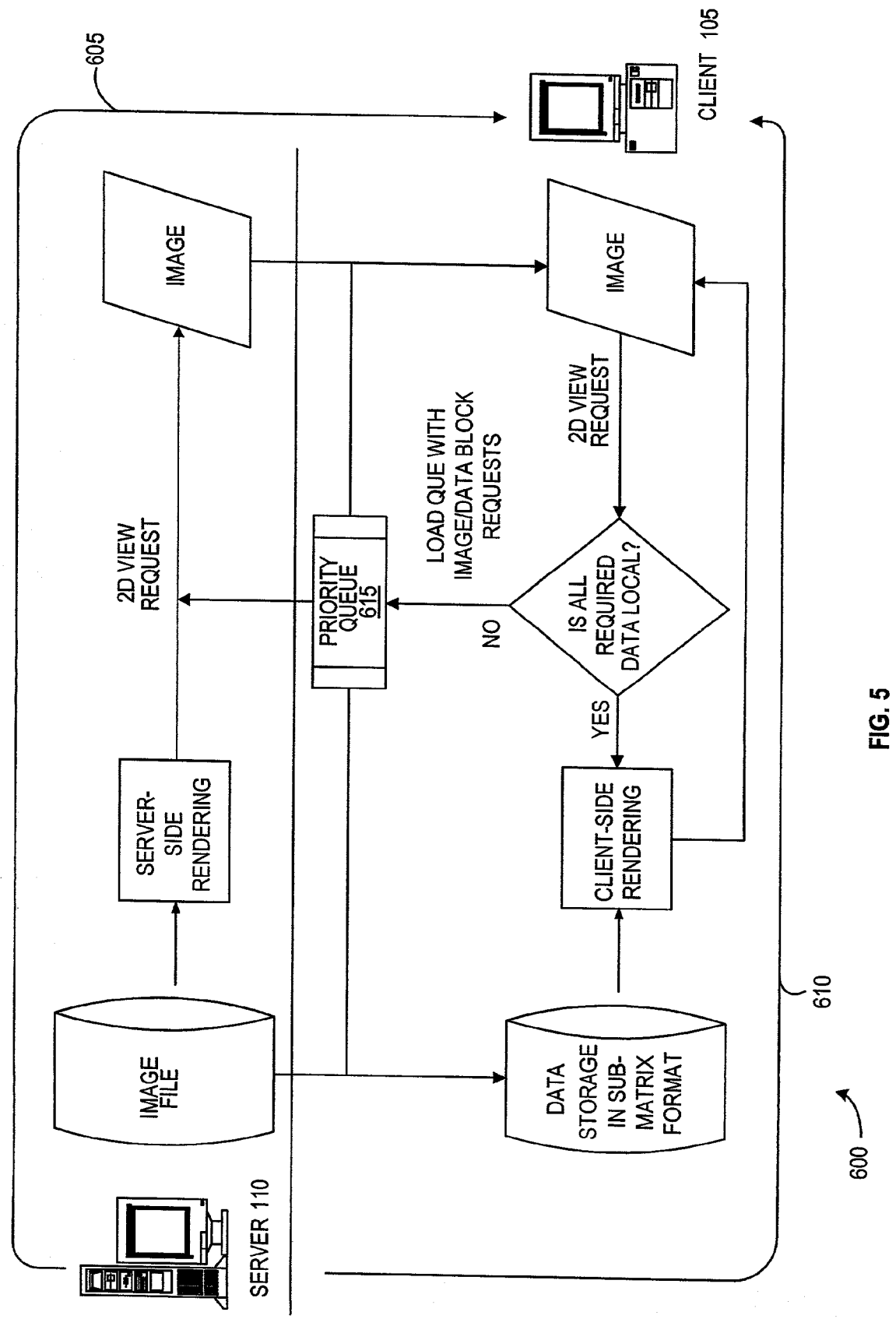
FIG. 5 is a schematic diagram representing one adaptive rendering technique for the system shown in FIG. 1.

In one embodiment (schematically represented as 600 in FIG. 5), the server 110 renders and communicates the requested image plane 440 (represented by path 605). When the client 105 receives the single image plane 440 from the server 110, it is immediately displayed. This process takes approximately 20 frames/second for a 512×512 image over a 100K/sec network using a lossy compression ratio of around 30 and about 2 frames/second using a lossless compression method. While the image is being displayed, the server 110 communicates to the client 105 the submatrices (the shaded submatrices of data structure 430) that contain the data for that view 440 (represented by path 610). A subsequent request for data in that region likely results in a condition where the data storage 190 contains all of the requested data blocks and client-based rendering occurs. If not all of the data for rendering the image is local, then the client 105 places a request on a priority queue 615 for the image plane and the associated submatrices. Requests for image planes take priority over requests for data blocks. The result of the adaptive rendering technique is that the images are displayed in a substantially real-time basis.

In another embodiment, requests for images to the server result in the server immediately communicating to the client 105 the plurality of matrices that contain the image data. The client 105 then stores the plurality of matrices as it receives the matrices and renders the requested image when the necessary matrices are stored. In some embodiments, if the client 105 already includes a communicated matrix, then it does not store that matrix (i.e., the matrix was already received in a previous request).

In yet other embodiments, the client 105 includes a general knowledge of the data structure 430 such that, when an image is requested, the client 105 requests only the necessary matrices for the client 105 to render a desired image.

Thus, the invention provides, among other things, a new and useful method of and system for storing, communicating, and displaying image data. Various features and advantages of the invention are set forth in the following claims.

What is claimed is:

1. A method of rendering an image of a multidimensional item, the rendering occurring at one of a server and a client, the server and the client in communication with a network, the method comprising:

storing a data file at the server, the data file including image data that is constructable to form the multidimensional item, wherein at least some of the image data is structured as submatrices satisfying the equation $$n_d = 2^{round} q \frac{\log_2(N_d)}{2} r \ 1 \le d \le D,$$

where $n_d$ is the number of points along dimension d of each submatrix, $N_d$ is the number of points alone dimension d of the full data set, and D is the total number of dimensions in the data set;

receiving a request for an image associated wit the stored data file;

performing at least one of determining a communications speed for the network, determining a memory size of a memory of the client, determining an available memory size of a memory of the client,
determining a computing capability of the client, and determining a session state; and
determining whether to render the image at the server or the client, the determination being based in part on at least one of
the communications speed of the network,
the memory size of the memory,
the available memory size of the memory,
the computing capability of a second computer, and
the session state;
rendering the image at the server when the determination is made to render the image at the server;
rendering the image at the client when the determination is made to render the image at the client; and
storing at least a portion of the image at the client when the determination is made to render the image at the client.

2. A method as set forth in claim 1 and further comprising:
communicating a portion of the image data from the server to the client via the network, the communicated portion of the image data including image data far displaying the image at the client; and
displaying the image at the client.

3. A method as set forth in claim 2 wherein communicating a portion of the image data occurs after rending the image at the server when the determination is made to render the image at the server.

4. A method as set forth in claim 3 wherein the communicated portion of the image data is the rendered image.

5. A method as set forth in claim 2 wherein communicating a portion of the image data occurs before rendering the image at the client when the determination is made to render the image at the client.

6. A method as set forth in claim 5 wherein rending the image at the client includes rendering the image using the communicated portion of the image data.

7. A method as set forth in claim 2 and further comprising:
storing the communicated portion of image data at the client.

8. A method as set forth in claim 7 and further comprising:
determining a second image;
determining whether the stored image data at the client includes data necessary for rendering the second image;
rendering the second image at the client when the stored image data includes the data necessary for rendering the second image; and
displaying the second image.

9. A method as set forth in claim 8 and further comprising:
communicating a second portion of the image data from the server to the client via the network when the stored imaged data does not include the data necessary for displaying the other image; and
storing the communicated second portion of the image data at the client.

10. A method as set forth in claim 1 wherein the multidimensional item is a representation of at least a portion of a physical object.

11. A method as set forth in claim 1 wherein the multidimensional item is a graphic.

12. A method as set forth in claim 1 wherein the image is an image plane.

13. A method as set forth in claim 1 wherein the method further comprises:
determining an image is based on the received request.

14. The method of claim 1, wherein the value of $n_d$ is subject to the constraint $$2^{12} \leq Z \leq 2^{14}, \text{ where } Z = \prod_{d=1}^{D} n_d.$$

15. A method of displaying images of a multidimensional item at a client, the multidimensional item being stored as a data file at a server, the data file including image data constructable to form the multidimensional item, the method comprising:
receiving a request for a first image;
communicating a first portion of the image data to the client, the first portion of the image data including data for displaying the first image;
storing the first portion of the image data at the client, the storing of the image data resulting in stored data, wherein at least some of the image data is structured as submatrices satisfying the equation $$n_d = 2^{round} q \frac{\log_2(N_d)}{2} r \ 1 \leq d \leq D,$$

where $n_d$ is the number of points along dimension d of each submatrix, $N_d$ is the number of points along dimension d of the full data set, and D is the total number of dimensions in the data set;
receiving a request for a second image;
determining whether the stored data includes the data for displaying the second image; and
if the stored data does not include the data for displaying the second image,
communicating a second portion of the image data to the client, and
storing the second portion of the image data at the client, the storing of the second portion of the image data resulting in the stored data including the data for displaying the second image.

16. A method as set forth in claim 15 and further comprising:
rendering the second image with the stored data when the stored data includes the data for displaying the second image; and
displaying the second image.

17. A method as set forth in claim 15 wherein the multidimensional item is representative of an object.

18. A method as set forth in claim 15 wherein the multidimensional item is a graphic.

19. A method as set forth in claim 15 wherein the structure of the data file includes submatrices,
wherein communicating a first portion of the image data includes communicating a first plurality of the submatrices to the client, the first plurality of submatrices including the data for displaying the first image, and
wherein storing the first portion of the image data includes storing the first plurality of submatrices at the client.

20. A method as set forth in claim 19 wherein communicating a second portion of the image data includes communicating a second plurality of the submatrices to the client, the second plurality of submatrices including at least a portion of the data for displaying the second image, and
wherein storing the second portion of the image data includes storing the second plurality of submatrices at the client resulting in the stored data including the data for displaying the second image.

21. A method as set forth in claim 20 and further comprising:
rendering the second image with the stored data when the stored data includes the data for displaying the second image.

22. The method of claim 15, wherein the value of $n_d$ is subject to the constraint $$2^{12} \le Z \le 2^{14}, \text{ where } Z = \prod_{d=1}^{D} n_d.$$

23. A method of communicating image data to a client for displaying images of an item, the method comprising:
providing an image file having image data;
storing the provided image file at a server, the stored image file including the image data structured as submatrices, wherein at least some of the submatrices satisfy the equation $$n_d = 2^{round} q \frac{\log_2(N_d)}{2} r \ 1 \le d \le D,$$

where $n_d$ is the number of points along dimension d of each submatrix, $N_d$ is the number of points along dimension d of the full data set, and D is the total number of dimensions in the data set;
communicating a first plurality of the submatrices to a client, the first plurality of submatrices including data renderable to form a first image;
receiving a request from the client;
communicating a second plurality of the submatrices to the client in response to the request;
communicating a third plurality of the submatrices, the third plurality of submatrices including data renderable to form a second image.

24. A method as set forth in claim 23 wherein the third plurality of submatrices includes the second plurality of submatrices.

25. A method as set forth in claim 24 wherein the third plurality of submatrices includes at least one of the submatrices of the first plurality.

26. A method as set forth in claim 24 wherein the third plurality of submatrices is the submatrices of the second plurality of submatrices.

27. A method as set forth in claim 23 and further comprising:
after receiving the request from the client, determining the second plurality of submatrices for communication to the client.

28. A method as set forth in claim 23 wherein storing the provided image file includes structuring the image data of the provided image file as an array of submatrices.

29. A method as set forth in claim 28 wherein the image data of the provided image file is structured as an array of parallel planes, and
wherein structuring the image data of the provided image file includes converting the provided image data from an array of parallel planes to the array of submatrices.

30. A method as set forth in claim 28 wherein the image data of the provided image file is structured as a three-dimensional array, and
wherein structuring the image data of the provided image file includes converting the provided image data from a three-dimensional array to an array of submatrices.

31. A method as set forth in claim 23 wherein receiving a request from the client includes receiving a request for a desired second image;
wherein the method further includes determining the plurality of the submatrices that includes the image data renderable to form the second image; and
wherein the determined submatrices being the second plurality of submatrices.

32. A method as set forth in claim 31 wherein receiving a request from the client includes receiving a request for the second plurality of submatrices.

33. The method of claim 23, wherein the value of $n_d$ is subject to the constraint $$2^{12} \le Z \le 2^{14}, \text{ where } Z = \prod_{d=1}^{D} n_d.$$

34. A method of displaying images of a three-dimensional item, the three dimensional item being stored at a server as an image file having image data, the image data structured with submatrices, the method comprising:
receiving a first plurality of the submatrices from the server;
storing the first plurality of submatrices, the storing of the submatrices resulting in stored submatrices, wherein at least same of the submatrices satisfy the equation $$n_d = 2^{round} q \frac{\log_2(N_d)}{2} r \ 1 \le d \le D,$$

where $n_d$ is the number of points along dimension d of each submatrix, $N_d$ is the number of points along dimension d of the full data set, and D is the total number of dimensions in the data set;
displaying a first image;
requesting a second image;
determining if the stored submatrices include image data renderable to form the second image;
if the stored submatrices does not include the image data renderable to form the second image
communicating a request to the server;
receiving a second plurality of submatrices from the server; and
storing the second plurality of submatrices at the client.

35. A method as set forth in claim 34 and further comprising:
if the stored submatrices include the image data renderable to form the second image,
rendering the second image, and
displaying the second image.

36. A method as set forth in claim 34 and further comprising:
displaying the second image.

37. A method as set forth in claim 34 wherein the first and second images are image planes.

38. A method as set forth in claim 34 wherein communicating a request includes communicating a request for the plurality of submatrices necessary to render the second image.

39. A method as set forth in claim 34 wherein the three-dimensional item represents a medical image of at least a portion of a patient.

40. The method of claim 34, wherein the value of $n_d$ is subject to the constraint $$2^{12} \leq Z \leq 2^{14}, \quad \text{where } Z = \prod_{d=1}^{D} n_d.$$

41. A method of storing an image file in memory, the method comprising:

receiving a three-dimensional image file by the server having image data representing a three-dimensional item;

structuring the received image file using submatrices, wherein at least some of the submatrices satisfy the equation $$n_d = 2^{round} q \frac{\log_2(N_d)}{2} r \quad 1 \leq d \leq D,$$

where $n_d$ is the number of points along dimension d of each submatrix, $N_d$ is the number of points alone dimension d of the full data set, and D is the total number of dimensions in the data set; and storing the structured image file.

42. A method as set forth in claim 41 wherein the submatrices are contiguous.

43. A method as set forth in claim 41 wherein the image data of the received image file is structured as an array of planes, and wherein structuring the received image file includes converting the received image file from an array of planes to an array of submatrices.

44. A method as set forth in claim 41 wherein the image data of the received image file is structured as a three-dimensional array, and wherein structuring the received image file includes convening the received image file from an a three-dimensional array to an array of submatrices.

* * * * *